United States Patent
Peters

(10) Patent No.: US 9,135,509 B2
(45) Date of Patent: Sep. 15, 2015

(54) DETERMINING REPRESENTATIVE IMAGES FOR A VIDEO

(75) Inventor: Marc Andre Peters, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 166 days.

(21) Appl. No.: 13/812,003

(22) PCT Filed: Jul. 21, 2011

(86) PCT No.: PCT/IB2011/053252
§ 371 (c)(1),
(2), (4) Date: Jan. 24, 2013

(87) PCT Pub. No.: WO2012/014129
PCT Pub. Date: Feb. 2, 2012

(65) Prior Publication Data
US 2013/0121586 A1    May 16, 2013

(30) Foreign Application Priority Data

Jul. 26, 2010    (EP) .................................... 10170773

(51) Int. Cl.
*G06K 9/00* (2006.01)
*G11B 27/28* (2006.01)
*G06F 17/30* (2006.01)

(52) U.S. Cl.
CPC ...... *G06K 9/00711* (2013.01); *G06F 17/30849* (2013.01); *G11B 27/28* (2013.01)

(58) Field of Classification Search
None
See application file for complete search history.

(56) References Cited

U.S. PATENT DOCUMENTS

| | | | |
|---|---|---|---|
| 5,635,982 A | 6/1997 | Zhang et al. | |
| 5,805,733 A * | 9/1998 | Wang et al. | 382/232 |
| 6,119,123 A | 9/2000 | Elenbaas et al. | |
| 6,549,643 B1 | 4/2003 | Toklu et al. | |
| 7,643,657 B2 | 1/2010 | Dufaux et al. | |
| 2003/0090505 A1* | 5/2003 | McGee et al. | 345/721 |
| 2003/0208626 A1* | 11/2003 | Gibbon et al. | 709/247 |
| 2003/0219232 A1 | 11/2003 | Lin | |
| 2008/0184128 A1* | 7/2008 | Swenson et al. | 715/738 |
| 2008/0253623 A1* | 10/2008 | Hauke | 382/118 |

(Continued)

FOREIGN PATENT DOCUMENTS

| | | |
|---|---|---|
| EP | 1557838 A2 | 7/2005 |
| JP | H08202849 A | 8/1996 |

OTHER PUBLICATIONS

Chasanis et al: "Scene Detection in Videos Using Shot Clustering and Sequence Alignment"; IEEE Transactions on Multimedia, vol. 11, No. 1, Jan. 2009, pp. 89-100.

(Continued)

*Primary Examiner* — Bhavesh Mehta
*Assistant Examiner* — David F Dunphy

(57) ABSTRACT

A video comprises at least one shot (SH), which is a continuous sequence of images representing a scene viewed from a particular location. Images are selected from a shot (SH) so as to obtain a continuous sequence of selected images (SI) that are evenly distributed throughout the shot. At least one continuous subsequence (SB1, SB2, SB3) of selected images that meet a predefined similarity test is identified. An image is selected from a continuous portion (SP) of the shot that coincides in time with the longest continuous subsequence (SB2) of selected images that meet the predefined similarity test. The image that is selected constitutes a representative image (RI) for the shot.

15 Claims, 4 Drawing Sheets

(56) References Cited

U.S. PATENT DOCUMENTS

2009/0128633 A1    5/2009   Chapman
2009/0167960 A1*   7/2009   Miyasato ................... 348/714
2009/0279777 A1*  11/2009   Malfait et al. ............... 382/168
2011/0208744 A1*   8/2011   Chandiramani et al. ...... 707/741

OTHER PUBLICATIONS

Durucan: "Low Computational Cost Illumination Invariant Change Detection for Video Surveillance by Linear Independence"; Jan. 2002, EOCLE Polytechnique Federale De Lausanne, 138 Page Document.

Girgensohn et al: "Time-Constrained Keyframe Selection Technique"; IEEE, 1999, pp. 756-761.

Hanjalic et al: "An Integrated Scheme for Automated Video Abstraction Based on Unsupervised Cluster—Validity Analysis"; IEEE Transactions on Circuits and Systems for Video Technology, vol. 9, No. 8, Dec. 1999, pp. 1280-1289.

Zhuang et al: "Adaptive Key Frame Extraction Using Unsupervised Clustering"; IEEE, 1998, pp. 866-870.

* cited by examiner

DETERMINING REPRESENTATIVE IMAGES FOR A VIDEO

FIELD OF THE INVENTION

An aspect of the invention relates to a method of determining a representative image for at least one shot in a video. The method may be used, for example, to assist a user in finding a specific piece of video in a relatively large video entity, such as, for example, a movie, a broadcast video recording, or a personal video recording. Other aspects of the invention relate to a method of browsing in a video, a method of searching a video in a collection of videos, a video processor; a storage medium, and a computer program.

BACKGROUND OF THE INVENTION

Determining representative images for a video can serve various purposes. For example, representative images may assist a user in browsing in a video so as to find a particular portion of interest. For example, the portion of interest may relate to a specific event, which the user wants to show to family or friends. As another example, the portion of interest may correspond with a point where the user was interrupted from viewing the video. An overview of respective portions of the video can include respective representative images for the respective portions. Such a visually based overview will generally allow the user to conveniently find the particular portion of interest. Representative images may also assist a user in finding a particular video in a collection of videos. Various techniques for determining representative images for a video have been proposed. Some of these techniques select images from scenes that comprise relatively much action to constitute representative images.

The article entitled "Adaptive Key Frame Extraction Using Unsupervised Clustering", by Zhuang Y. et al. published in the proceedings of the International Conference on Image Processing (ICIP'98), Volume 1, 1998, pp. 866, describes an algorithm for key frame extraction based on unsupervised clustering. A video shot comprising N frames is obtained from a shot boundary detection algorithm, N being an integer number. The N frames of the video shot are clustered into M clusters, M being an integer number. Each cluster has a centroid, which needs to be recalculated when a new image is added to the cluster. For a frame under the consideration, a measure of similarity is calculated between that frame and the centroid of each cluster. A new cluster is created for the frame under consideration in case all measures of similarity thus calculated for that frame are below a threshold. Otherwise, the frame under consideration is assigned to an already existing cluster, namely the cluster for which the measure of similarity has the highest value. The higher the threshold parameter is, the greater the number M of clusters that will be obtained. Once the clusters have been formed, a key frame is extracted from each cluster that has a size is bigger than N/M, the average size of clusters. The key frame for a cluster is the frame which is closest to the cluster centroid.

SUMMARY OF THE INVENTION

There is a need for a solution that allows determining a representative image for a video in a relatively fast and effective manner.

In accordance with an aspect of the invention, there is provided a method of determining a representative image for at least one shot in a video, a shot being a continuous sequence of images representing a scene viewed from a particular location. The method comprises:

a shot sampling step in which images are selected from a shot so as to obtain a continuous sequence of selected images that are evenly distributed throughout the shot;

a stable shot portion identification step in which at least one continuous subsequence of selected images that meet a predefined similarity test is identified; and a representative image designation step in which an image is selected from a continuous portion of the shot that coincides in time with the longest continuous subsequence of selected images that meet the predefined similarity test, whereby the image that is selected constitutes a representative image for the shot.

Accordingly, the longest continuous portion of the shot that is relatively stable in terms of image content provides the representative image. The representative image is thus effectively taken from a piece of content that has a relatively long viewing time. As a result, there is a relatively high probability that a user will associate the representative image with the shot. What is more, the representative image will generally be of relatively good quality due to the stability of the portion of the shot from which the representative images is taken.

Another advantage of the invention relates to the following aspects. Determining the representative image in accordance with the invention can be achieved with relatively few image comparisons. For example, the similarity test for an image under consideration may be carried out by comparing that image with one other image only. This is in contrast with the algorithm described in the article mentioned hereinbefore, which requires an image comparison for each cluster and, moreover, recalculation of cluster centroids. Image comparisons are generally computationally intensive and therefore relatively slow. The invention thus allows the representative image to be determined in a relatively fast manner, thanks to a reduced number of image comparisons that are involved in doing so.

An implementation of the invention advantageously comprises one or more of the following additional features, which are described in separate paragraphs. These additional features each contribute to determining a representative image for a video in a relatively fast and effective manner.

In the stable shot portion identification step, the following series of steps are advantageously carried out for respective selected images:

a measure of difference determining step in which at least one image property of a selected image is compared with that of another selected image according to a predefined scheme so as to determine a measure of difference for the selected image; and a measure of difference evaluation step in which the selected image is classified as belonging to a continuous subsequence of selected images that meet the similarity test, or not, depending on whether the measure of difference for the selected image is below a threshold, or not, respectively.

The predefined scheme may define that the selected image is compared with an immediately neighboring selected image.

The predefined scheme may define that, in case the immediately preceding selected image belongs to a continuous subsequence of selected images that meets the similarity test, the selected image is compared with the selected image that starts this continuous subsequence of selected images. Such a scheme allows avoiding slow "drift" of image content in a continuous subsequence in the sense that image content slowly but surely changes throughout the continuous subsequence. Such slow drift may occur if the predefined scheme provides that the selected image is compared with the immediately neighboring selected image only.

In the measure of difference determining step, respective image property differences are advantageously combined into a difference metric, which constitutes the measure of difference, the respective image property differences being obtained by comparing respective image properties of the selected image with those of at least one other selected image.

In the shot sampling step, one image is advantageously selected out of each series of N consecutive images, N being an integer greater than 1. There will be less computational effort in an implementation with this additional feature than one in which all images of a shot are selected. In fact, N represents a subsampling factor. The greater N is, the less computational effort will be required. However, the greater N is, the less precise the longest stable portion in a shot can be identified. An appropriate trade-off between these two aspects can be found.

In the representative image designation step, a length indication is advantageously provided for the representative image, the length indication representing a time interval covered by the continuous portion of the shot from which the representative image is selected.

The method may advantageously comprise:

a shot association step in which a shot is associated with at least one other shot that, when compared with the shot, meets a shot similarity test; and a length indication upgrading step in which the length indication for the representative image of the shot is upgraded by adding thereto respective length indications for respective representative images of respective other shots that have been associated with the shot. These additional features may advantageously be used for determining a representative image when two or more alternating series of similar shots occur in a video. For example, a video portion may represent a dialogue between two persons A and B, whereby shots of the person A and shots of the person B alternately occur, depending on who is talking In fact, it can be considered that the video portion comprises a single shot of the person A and a single shot of the person B, which are interchanged several times.

In accordance with another aspect of the invention, a method of browsing in a video makes use of respective representative images that have been determined for respective shots comprised in the video and respective length indications for the respective representative images. The method comprises:

a section definition step in which respective sections in the video are defined, whereby the following step is carried out for respective sections in the video:

a representative image selection step in which respective length indications for respective representative images of respective shots in a section are compared, whereby the representative image that has the largest length indication is selected to constitute a representative image for the section.

The method advantageously comprises a navigation enabling step in which a navigation screen is generated that comprises the respective representative images for the respective sections in the video, whereby the respective representative images are comprised in respective selectable areas associated with the respective sections.

In accordance with yet another aspect of the invention, a method of determining a representative image for a video makes use of respective representative images that have been determined for respective shots comprised in the video, and respective length indications for the respective representative images. The method comprises a representative image selection step in which the respective length indications for the respective representative images are compared, whereby the representative image that has the largest length indication is selected to constitute a representative image for the video.

In accordance with yet another aspect of the invention, a method of searching a video in a collection of videos makes use of respective representative images that have been selected for respective videos in the collection, the method comprising:

a search step in which respective videos in the collection are identified that meet a search criterion;

a search results processing step in which, among the respective videos that meet the search criterion, respective videos are identified for which the respective representative images meet an image similarity test; and a search representation step in which the respective videos for which the respective representative images that meet the image similarity test, are jointly indicated as a single search result item.

A detailed description, with reference to drawings, illustrates the invention summarized hereinbefore as well as the additional features.

DETAILED DESCRIPTION

Figure 1:
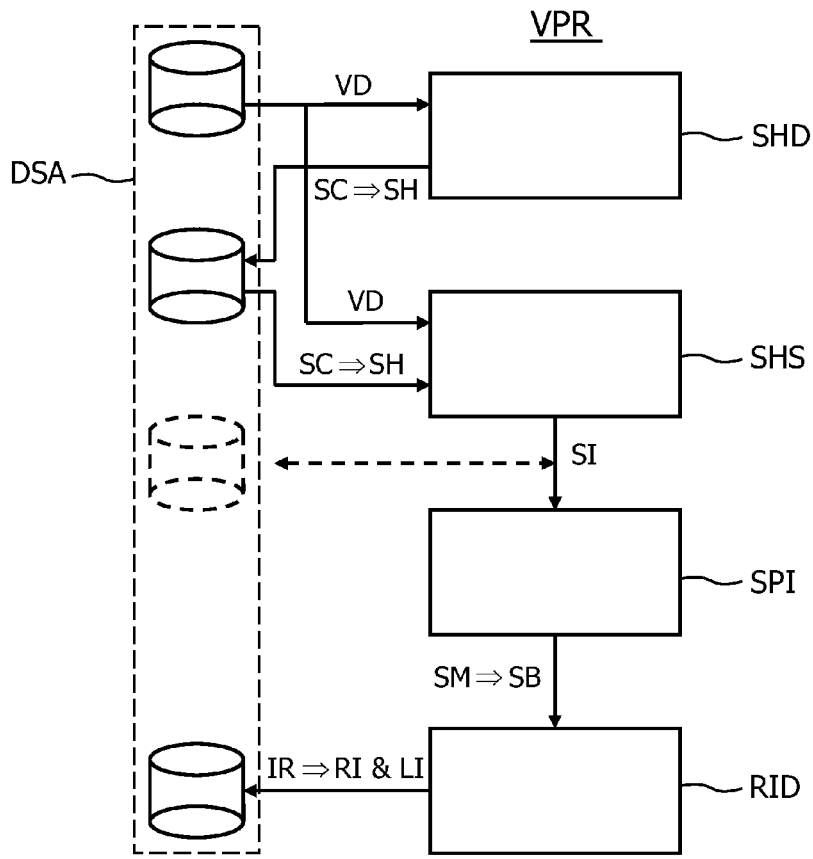
FIG. 1 is a functional diagram that illustrates a video processor capable of determining representative images for respective shots comprised in a video.

FIG. 1 functionally illustrates a video processor VPR. The video processor VPR comprises various functional modules: a shot detection module SHD, a shot sampling module SHS, a stable shot portion identification module SPI, and a representative image designation module RID. The video processor VPR is coupled to a data storage arrangement DSA in which a video VD is stored at least partially and temporarily. Video processing results may be stored in the data storage arrangement DSA in association with the video VD, as illustrated in FIG. 1. The video processor VPR may form part of, for example, a video server, a personal multimedia device or a personal communication device.

The aforementioned functional modules may each be implemented by means of, for example, a set of instructions that has been loaded into an instruction execution device. In such a software-based implementation, the set of instructions defines operations that the functional module concerned carries out, which will be described hereinafter. In this respect, FIG. 1 can be regarded as representing a method, at least partially, whereby a functional module, or a combination of functional modules, can be regarded as representing a step of the method. For example, the shot sampling module SHS can be regarded as representing a shot sampling step, the stable shot portion identification module SPI can be regarded as representing a stable portion identification step, and so on. Similar remarks apply to other functional modules, which will be described hereinafter with reference to other Figures.

The video processor VPR basically operates as follows. The shot detection module SHD detects various shots SH comprised in the video VD. A shot is a continuous sequence of images representing a scene viewed from a particular location. The shot detection module SHD may operate in a conventional manner. For example, the shot detection module SHD may detect shot cuts in the video VD. Relatively significant changes in a relatively short series of successive images characterize a shot cut. A shot cut may include a special effect, such as, for example, fading. It is possible to detect shot cuts in a sufficiently reliable manner by applying an appropriate algorithm and by applying appropriate shot cut detection parameters. There is abundant literature regarding this subject. A shot is typically comprised between two successive shot cuts, the first marking the start of the shot and the latter marking the end. The shot detection module SHD may thus provide shot cut markers SC, which effectively partition the video VD into respective shots SH. The shot cut markers SC may be stored in association with the video VD.

The shot sampling module SHS selects a shot for which a representative image needs to be determined. The shot sampling module SHS then selects images from that shot so as to obtain a continuous sequence of selected images SI that are evenly distributed throughout the shot. For example, the shot sampling module SHS may select one image out of each series of N consecutive images in the shot, N being an integer greater than 1. This is effectively a video sub-sampling process, with a sampling rate equal to N. The continuous sequence of selected images SI has an image rate that is N times lower than that of the video VD. The continuous sequence of selected images SI may temporarily be stored in, for example, the data storage arrangement DSA.

The stable shot portion identification module SPI identifies one or more continuous subsequences SB of selected images that meet a predefined similarity test. This similarity test is typically more stringent than tests typically used for shot cut detection. Otherwise, the stable shot portion identification module SPI may systematically identify all the selected images of the shot as belonging to a single continuous subsequence that meets the predefined similarity test. The predefined similarity test may be based on, for example, image properties, such as luminance, chrominance, texture, edges. This will be discussed in greater detail hereinafter.

The stable shot portion identification module SPI may provide an output in the form of subsequence markers SM. The subsequence markers SM indicate the one or more continuous subsequences SB of selected images that have been identified as meeting the predefined similarity test. For example, a subsequence marker may indicate a serial number of a selected image that marks the start of a subsequence or that marks the end of a subsequence. The subsequence marker that has the lowest serial number typically indicates the start of a first subsequence. The subsequence marker that has the one but lowest serial number typically indicates the end of the first subsequence, and so on. This is merely an example. Time indications can be used instead of serial numbers. In any case, the subsequence markers SM provide location information and length information on the continuous subsequences SB of selected images that have been identified.

The representative image designation module RID determines the longest continuous subsequence of selected images that meet the predefined similarity test. The longest continuous step sequence of selected images can be determined on the basis of the subsequence markers SM, which the stable shot portion identification module SPI provides. For example, the representative image designation module RID may determine the longest continuous subsequence by comparing respective distances between respective pairs of subsequence markers SM that delimit respective subsequences of selected images SI that meet the predefined similarity test. The longest distance indicates the longest continuous subsequence.

The representative image designation module RID selects an image from a continuous portion of the shot that coincides in time with the aforementioned longest continuous subsequence of selected images. The image that is thus selected constitutes a representative image RI for the shot. The representative image designation module RID may provide an output in the form of a representative image identifier IR. The representative image identifier IR uniquely designates the representative image RI in the video VD, as well as the shot to which the representative image RI belongs.

The representative image designation module RID may further provide a length indication LI for the representative image RI. The length indication LI represents a time interval covered by the continuous portion of the shot from which the representative image RI is selected. The length indication LI may be included in the representative image identifier IR The representative image designation module RID may determine the length indication LI on the basis of the subsequence markers SM that indicate the longest subsequence of selected images that meet the predefined similarity test. For example, let it be assumed that the subsequence markers SM are in the form of serial numbers of selected frames that delimit the subsequences that have been identified. In that case, the difference between the subsequence markers SM that indicate the longest subsequence corresponds with the number of selected frames comprised in the longest subsequence. In case the shot sampling module SHS applies a constant sampling rate, this number of selected frames may constitute the length indication LI. The number of selected frames may also be divided by the frame rate of the sequence of selected frames. Accordingly, the duration of the longest subsequence is obtained, which may constitute the length indication LI.

The video processor VPR illustrated in FIG. 1 may determine respective representative images RI for respective shots SH comprised in the video VD in a manner as described hereinbefore. To that end, the shot sampling module SHS may successively select the respective shots SH in the video VD. The shot sampling module SHS, the stable shot portion identification module SPI, and the representative image designation module RID, then carry out operations described hereinbefore for a currently selected shot. Accordingly, the video processor VPR then provides respective representative image identifiers IR for the respective shots SH, which effectively point to the respective representative images. RI The video processor VPR further provides respective length indications LI for the respective representative images RI. The respective representative image identifiers IR, as well as the respective length indications LI, are stored in association with the video VD and the respective shot cut markers SC, which identify the respective shots SH in the video VD. All this data can be jointly stored in the data storage arrangement DSA illustrated in FIG. 1. Alternatively, the data may be stored in different storage arrangements provided that there is some form of link between the different types of data relating to the video VD.

Figure 2:
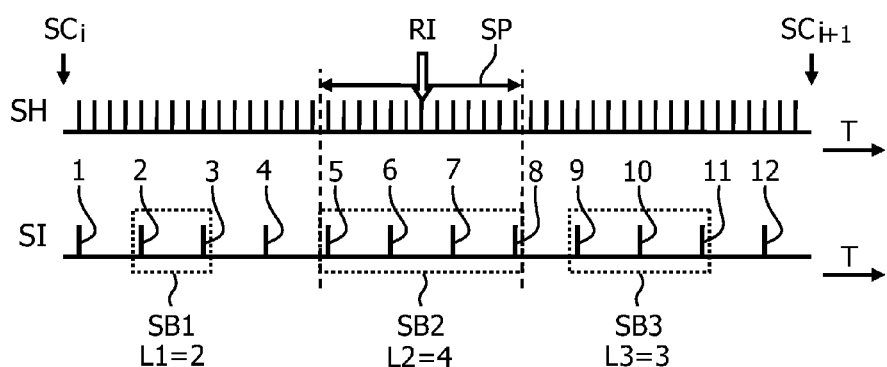
FIG. 2 is a conceptual diagram that illustrates various operations that the video processor carries out.

FIG. 2 conceptually illustrates various operations that the shot sampling module SHS, the stable shot portion identification module SPI, and the representative image designation module RID carry out. FIG. 2 comprises an upper horizontal section that represents a shot SH comprised between two successive shot cut markers $SC_i$, $SC_{i+1}$. Relatively small vertical lines represent images within the shot SH. The images are evenly disposed on a horizontal axis that represents time T. FIG. 2 comprises a lower horizontal section having a similar horizontal axis on which the selected images SI from the shot are represented by means of relatively small vertical lines. One image is selected out of each series of 4 consecutive images in the shot, as illustrated in FIG. 2. The selected images SI represented in the lower horizontal section of FIG. 2 are numbered from 1 to 12.

Selected images 2 and 3 constitute a first continuous subsequence SB1 of selected images that meet the similarity test. The first continuous subsequence SB1 has a length L1 of 2 selected images. Selected images 5, 6, 7, and 8 constitute a second continuous subsequence SB2 of selected images that meet the similarity test. The second continuous subsequence SB2 has a length L2 of 4 selected images. Selected images 9, 10, and 11 constitute a third continuous subsequence SB3 of selected images that meet the similarity test. The third continuous subsequence has a length L3 of 3 selected images.

In the upper horizontal section of FIG. 2, a continuous stable portion SP of the shot SH is indicated. This continuous stable portion SP coincides in time with the second continuous subsequence SB2 of selected images, which is the longest continuous subsequence of selected images that meet the predefined similarity test. The continuous stable portion SP thus constitutes the longest stable portion of the shot SH. In this context, the terms "stable" refers to stability of image content; the continuous stable portion SP is relatively static for a relatively long duration.

An image is selected from the continuous stable portion SP of the shot indicated in FIG. 2, which is the longest stable portion of the shot. The image that is selected from the continuous stable portion SP of the shot constitutes the representative image RI for the shot concerned. In principle, the image that is selected may be any image in the continuous stable portion SP of the shot. This is because the continuous stable portion SP of the shot is relatively static, meaning that the images comprised therein are relatively similar to each other. Otherwise, the selected images 5, 6, 7, and 8 that constitute the second subsequence SB2 would not have met the similarity test. In FIG. 2, the image that is selected to be the representative image RI is at the center of the continuous stable portion SP. This is merely an example. Any other image of the continuous stable portion SP, such as the first image or the last image, may also be selected to constitute the representative image RI. The representative image RI could even be chosen randomly.

The representative image RI will generally be of relatively good quality. This is because the representative image RI is selected from a portion of the shot that is relatively stable in terms of image content. For example, in case the images have been coded, coding losses will be relatively modest in the continuous stable portion SP of the shot indicated in FIG. 2 because the images in that portion are relatively similar. For example, let it be assumed that the images have been coded in accordance with an MPEG standard, which implies motion estimation and quantization. In that case, the motion estimation for the images in the continuous stable portion SP indicated in FIG. 2 will be relatively precise. There will be a relatively small residue. Moreover, the image is in the continuous stable portion SP will typically undergo a modest degree of quantization.

Figure 3:
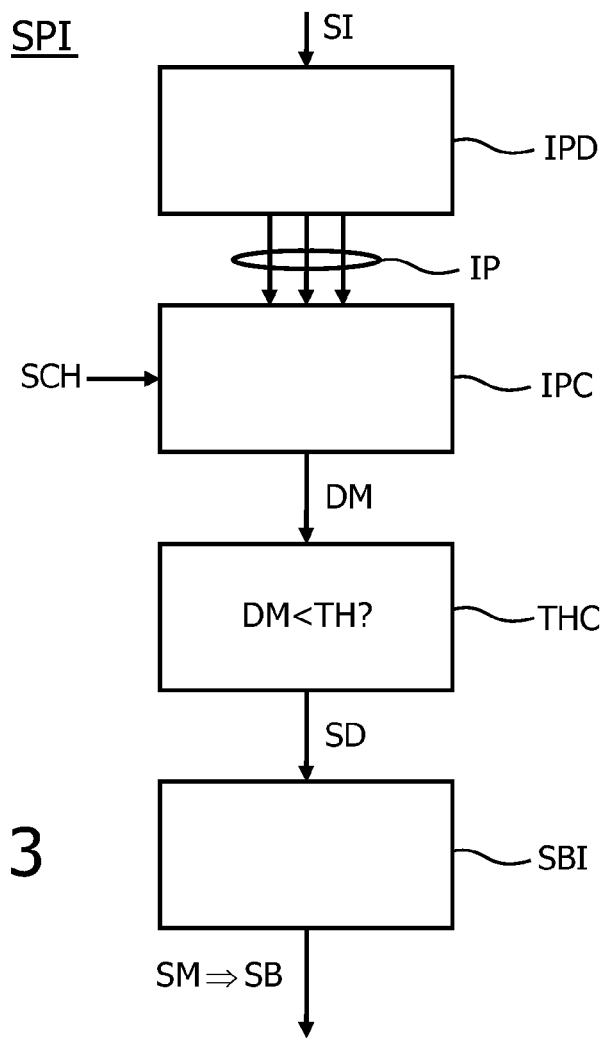
FIG. 3 is a functional diagram that illustrates a stable shot portion identification module, which forms part of the video processor.

FIG. 3 functionally illustrates an implementation of the stable shot portion identification module SPI. This implementation will be referred to as the stable shot portion identification module SPI for reasons of simplicity. The stable shot portion identification module SPI comprises various functional modules: an image property determination IPD module, an image property comparison module IPC, a threshold comparison module THC, and a subsequence identification module SBI. For a software-based implementation, FIG. 3 can be regarded as representing a method, at least partially, whereby a functional module, or a set of functional modules, can be regarded as a step of the method.

The stable shot portion identification module SPI illustrated in FIG. 3 basically operates as follows. The image property determination module IPD determines at least one image property of a selected image. The image property determination module IPD may thus provide respective sets of image properties IP for respective selected images SI. A set of image properties IP may comprise, for example, a luminance histogram, a chrominance histogram, texture information, and edge information. An image property may take the form of information defined in a standard known as MPEG 7.

The image property comparison module IPC compares the set of image properties IP of a selected image under consideration with that of another selected image according to a predefined scheme SCH. For example, the predefined scheme SCH may provide that the selected image under consideration is compared, in terms of image properties, with the selected image that immediately precedes the selected image under consideration. As another example, the predefined scheme SCH may first verify whether following case applies, or not: the selected image that immediately precedes the image under consideration belongs to a continuous subsequence of selected images that meet the similarity test. The image under consideration is compared, in terms of image properties IP, with the selected image that starts this continuous subsequence of selected images if the case defined hereinbefore applies.

For any predefined scheme SCH, the image property comparison module IPC determines a set of image property differences for a selected image under consideration. The set of image property differences results from image property comparisons that are made according to the predefined scheme SCH. The image property comparison module IPC advantageously combines the image property differences for the selected image under consideration into a difference metric DM, which constitutes a one-dimensional measure of difference. The image property comparison module IPC thus provides respective difference metrics DM for respective selected images SI. A difference metric DM for a selected image will have a relatively low value in case the selected image is relatively similar to one or more other selected images with which the selected image is compared according to the predefined scheme SCH. Conversely, the difference metric DM will have relatively high value in case the images that are compared according to the predefined scheme SCH are relatively different.

The threshold comparison module THC compares the respective difference metrics DM, which the image property comparison module IPC provides, with a threshold TH. This comparison provides respective similarity decisions SD for the respective selected images SI. A similarity decision SD for a selected image is positive if the difference metric DM for the selected image is below the threshold TH. Otherwise, the similarity decision SD is negative. In fact, the similarity decision SD indicates whether the selected image concerned is sufficiently similar, or not, which respect to the one or more other selected images with which the selected image have been compared in terms of image properties. Stated differently, the similarity decision SD indicates whether the selected images that have been compared meet the predefined similarity test, or not.

The subsequence identification module SBI identifies one or more subsequences SB of selected images that meet the predefined similarity test on the basis of the respective similarity decisions SD, which the threshold comparison module THC provides. Let it be assumed that a positive similarity decision follows a negative similarity decision. In that case, the positive similarity decision marks the start of a subsequence of selected images that meet the similarity test. The subsequence comprises at least the selected images on which the positive similarity decision is based. Let it further be assumed that a further positive similarity decision follows the aforementioned positive similarity decision. In that case, the subsequence is prolonged, as it were, and further comprises the selected images on which this further positive similarity decision is based. The subsequence continues to be prolonged until a negative similarity decision occurs. The negative similarity decision then marks the end of the subsequence of selected images. A new positive similarity decision will mark the start of a new subsequence of selected images.

The threshold TH that is used to translate, as it were, difference metrics DM into similarity decisions SD can be a critical parameter. The threshold TH represents a degree of severity of the predefined similarity test. In case the threshold TH is too high, it can occur that subsequences SB of selected images are rarely identified, or not even identified at all. Conversely, in case the threshold TH is too low, it can frequently occur that all selected images of the shot are identified as belonging to a single subsequence, which covers the entire shot. An appropriate level for the threshold TH may be determined, for example, in an empirical manner.

The subsequence identification module SBI provides an output that corresponds with that of the stable shot portion identification module SPI illustrated in FIG. 1. Namely, the subsequence identification module SBI provides the subsequence markers SM that indicate the one or more continuous subsequences SB of selected images that have been identified as meeting the predefined similarity test. The subsequence markers SM provide location information and length information on the continuous subsequences SB of selected images that have been identified.

Figure 4:
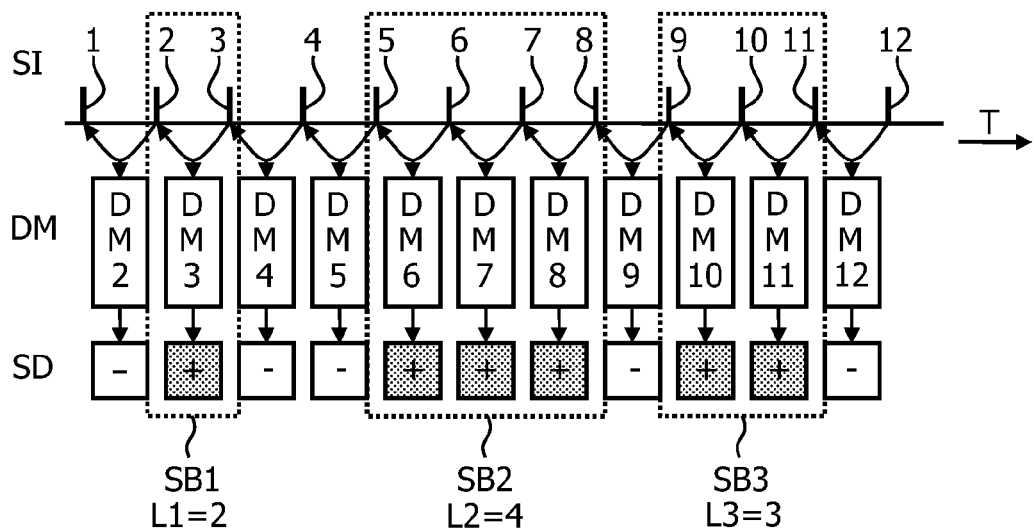
FIG. 4 is a conceptual diagram that illustrates various operations that the stable shot portion identification module carries out.

FIG. 4 conceptually illustrates various operations that the stable shot portion identification module SPI carries out. FIG. 4 comprises an upper horizontal section that represents the selected images SI of the shot, which are also illustrated in FIG. 2. That is, the upper horizontal section of FIG. 4 corresponds with the lower horizontal section of FIG. 2. The selected images SI, which are numbered from 1 to 12, are evenly disposed on a horizontal axis that represents time T. FIG. 4 comprises a middle horizontal section in which respective difference metrics DM are indicated. FIG. 4 further comprises a lower horizontal section in which respective similarity decisions SD are indicated.

FIG. 4 constitutes an example, in which the predefined scheme SCH provides that a selected image under consideration is compared with the immediately preceding selected image. In FIG. 4, slightly curved arrows illustrate these image comparisons. For example, let it be assumed that selected image 2 is under consideration. In that case, selected image 2 is compared with selected image 1 in terms of image properties. This comparison results in difference metric DM2. The difference metric DM2 translates, as it were, into a negative similarity decision (−). This is because the difference metric DM2 is above the aforementioned threshold TH. Let it be now assumed that selected image 3 is under consideration. In that case, selected image 3 is compared with selected image 2 in terms of image properties. This comparison results in difference metric DM3, which translates into a positive similarity decision (+) because the difference metric DM3 is below the threshold TH.

FIG. 4 illustrates that a negative to positive transition in similarity decisions marks the start of a subsequence SB of selected images that meets the predefined similarity criterion. A positive to negative transition in similarity decisions marks the end of a subsequence SB. A subsequence comprises selected images on which one or more consecutive positive similarity decisions were based. For example, difference metric DM3, which translates into a positive similarity decision (+), is preceded by difference metric DM2, which translates into a negative similarity decision (−). This marks the start of the first subsequence SB1 of selected images. Difference metric DM3 is followed by difference metric DM4, which translates into a negative similarity decision (−). This marks the end of the first subsequence SB1. Difference metric DM3 is based on selected images 2 and 3, which thus forms the first subsequence SB1.

As another example, difference metric DM6, which translates into a positive similarity decision (+), is preceded by difference metric DMS, which translates into a negative similarity decision (−). This marks the start of the second subsequence SB2 of selected images. Difference metric DM6 is followed by difference metrics DM7 and DM8, each of which equally translates into a positive similarity decision (+). The second subsequence SB2 continues, as it were. Difference metric DM9 translates into a negative similarity decision (−). This marks the end of the second subsequence SB2. There are three consecutive difference metrics DM6, DM7, and DM8 that translate into three consecutive positive similarity decisions (+). These three consecutive difference metrics DM6, DM7, and DM8 are based selected images 5, 6, 7 and 8, which occur consecutively, and thus form the second subsequence SB2.

Figure 5:
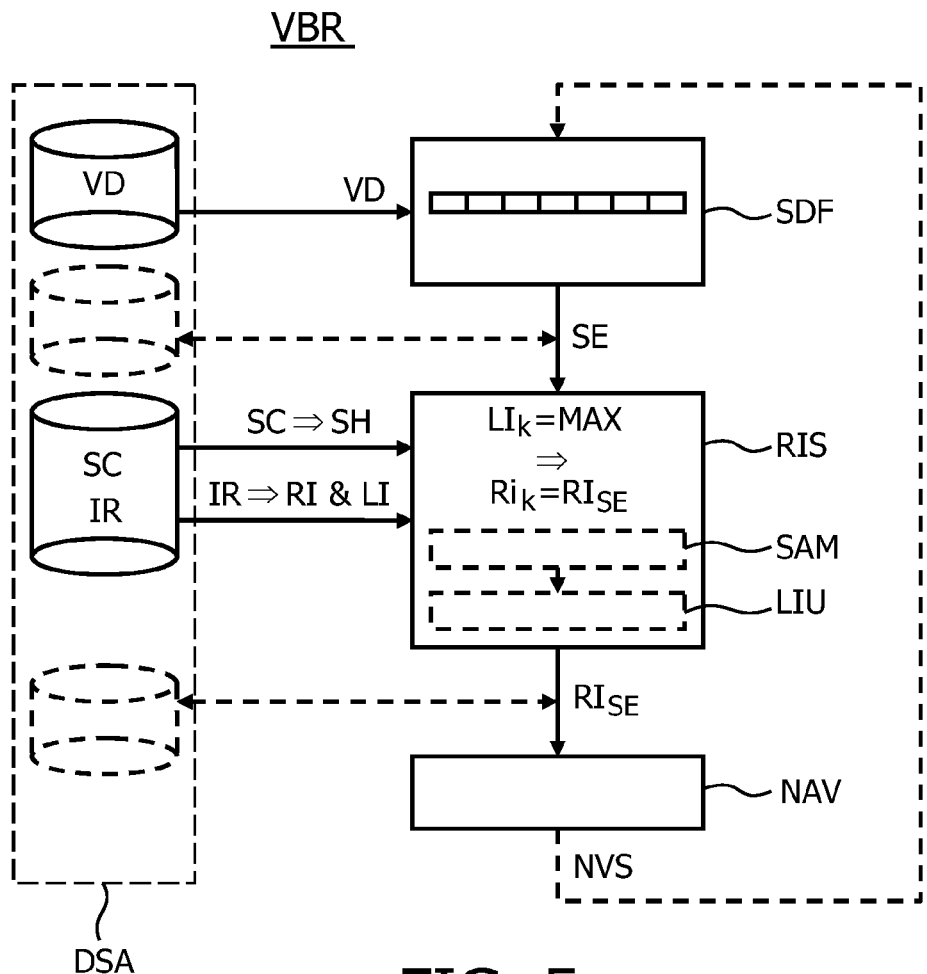
FIG. 5 is a functional diagram that illustrates a video browser, which uses results that the video processor produces.

FIG. 5 illustrates a video browser VBR. The video browser VBR comprises a section definition module SDF, a representative image selection module RIS, and a navigation enabling module NAV. These further functional modules may be comprised in, for example, the video processor VPR illustrated in FIG. 1. Alternatively, the functional modules illustrated in FIG. 5 may be comprised in another video processor. In any case, for a software-based implementation, FIG. 3 can be regarded as representing a method, at least partially, whereby a functional module, or a combination of functional modules, can be regarded as a step of the method.

The video browser VBR illustrated in FIG. 5 uses results that the video processor VPR illustrated in FIG. 1 provides. These results comprise the respective representative images RI that have been determined for the respective shots SH in the video VD. The results further comprise the respective length indications LI for the respective representative images. As mentioned hereinbefore, these results may be in the form of respective representative image identifiers IR for the respective shots SH, which effectively point to the respective representative images. The respective length indications LI can be included in the respective representative image identifiers IR. All this data may be stored in a data storage arrangement DSA, which may correspond with that illustrated in FIG. 1, or may be another data storage arrangement to which the data has been transferred.

The video browser VBR basically operates as follows. The section definition module SDF allows defining respective sections SE in the video VD. For example, the video VD can effectively be divided into respective sections SE covering respective successive time intervals of a given length. As a further example, the video VD can be divided into respective 10 minutes time intervals. Such a division can be appropriate if, for example, the video VD is a movie or a broadcast recording. The section definition module SDF may subdivide a particular section into various subsections. For example, a particular 10 minute time interval may be subdivided into respective 1 minute time intervals.

In case the video VD comprises personal recordings, respective sections SE can be defined on the basis of date and time of recording. For example, recordings that have been made shortly after each other are most certainly interrelated and can therefore be grouped into a section. Recordings that have been made the same day can also be grouped into a section. These recordings may concern, for example, a particular event, such as a birthday, a wedding, or a one-day trip to visit a particular destination. Recordings that have been made on consecutive days can also be grouped into a section. For example, the recordings may concern a vacation. These examples demonstrate that sections can be defined at different hierarchical levels on the basis of the date and time of recording.

The representative image selection module RIS retrieves respective length indications LI for respective representative images of respective shots SH in a section SE. The representative image selection module RIS compares these respective length indications LI so as to determine the largest length indication $LI_k$=MAX. The representative image selection module RIS then selects the representative image $RI_k$ that has this largest length indication LI. This selected representative image RIk constitutes a representative image $RI_{SE}$ for the section. The representative image selection module RIS may thus define respective representative images for the respective sections of the video VD that have been defined.

Figure 6:
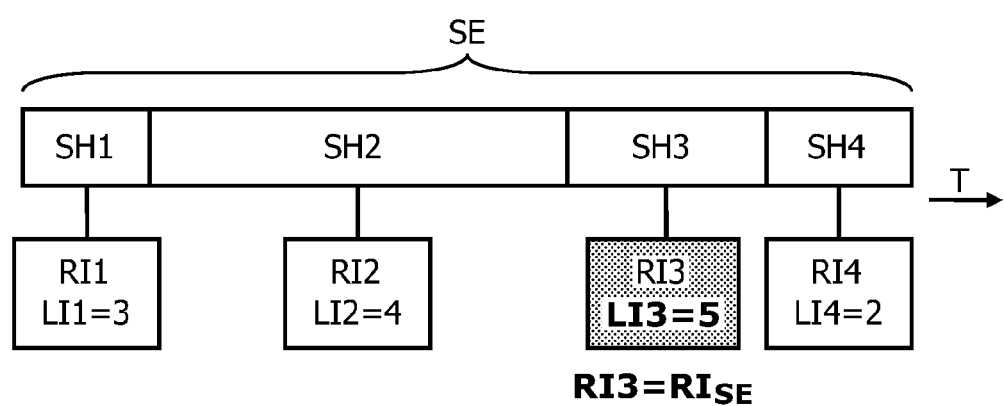
FIG. 6 is a conceptual diagram that illustrates various operations that a representative image selection module carries out.

FIG. 6 conceptually illustrates operations that the representative image selection module RIS carries out. FIG. 6 comprises an upper horizontal section that represents a particular section SE in the video VD. This particular section SE comprises four respective shots SH1-SH4 of different length. These four respective shots SH1-SH4 have four respective representative images RI1-RI4. The four respective representative RI1-RI4 images have four respective length indications LI1-LI4. This is indicated in a lower horizontal section of FIG. 6. Representative image RI3 of shot SH3 has the largest length indication LI3=5, although shot SH3 is not the longest among the four respective shots SH1-SH4 in the section SE. However, shot SH3 comprises a continuous subsequence of selected images that meet the predefined similarity test, which is longer than any other continuous subsequence in any of the other three shots SH1, SH2, and SH4. Stated differently, shot SH3 comprises the longest stable video portion among the stable video portions that that have been identified in the four respective shots SH1-SH4. Consequently, representative image RI3 of shot SH3 has the largest length indication LI3=5 and is therefore selected to constitute the representative image $RI_{SE}$ for the section SE.

The representative image selection module RIS may optionally comprise a shot association module SAM and a length indication upgrading module LIU. These modules may advantageously be used for selecting a representative image in a video section with two or more alternating series of similar shots. For example, a video section may represent a dialogue between two persons A and B, whereby shots of the person A and shots of the person B alternately occur, depending on who is talking In effect, it can be considered that the video section comprises a single shot of the person A and a single shot of the person B, which are interchanged several times.

The shot association module SAM can compare a shot with another shot so as to verify whether the one and the other shot meet a predefined shot similarity test, or not. The shot similarity test may be based on image properties identical to those on which the image similarity test is based, which is used to identify continuous subsequences of selected images as discussed hereinbefore with reference to FIGS. 1-4. Referring to FIG. 3, the image property determination module IPD may store respective sets of image properties IP that have been determined. The shot association module SAM illustrated in FIG. 5 may then use these results for determining whether two shots meet the predefined shot similarity test, or not. In case two shots meet the predefined shot similarity test, the shot association module SAM associates the two shots with each other. In similar fashion, the shot association module SAM may associate yet further shots with the two shots that have been associated with each other.

The length indication upgrading module LIU upgrades the length indication LI for the representative image RI of a shot that has been associated with at least one other shot. Namely, the length indication LI is upgraded by adding thereto the respective length indications for the respective representative images of the respective other shots that have been associated with the shot. What is more, a single representative image may be retained for respective shots that have been associated with each other. This single representative image has a length indication that has been upgraded as described hereinbefore. In case a length indication has been upgraded, the representative image selection module RIS will take this upgraded length indication into account for determining the representative image $RI_{SE}$ of the section.

The navigation enabling module NAV generates a navigation screen NVS that comprises the respective representative images RI that have been selected for the respective sections in the video VD. In the navigation screen NVS, the respective representative images RI are comprised in respective areas associated with the respective sections in the video VD. The respective areas may further comprise textual information in addition to the representative image. Textual information may indicate, for example, a particular time interval, or a date and time of recording, or both. In any case, a particular section is selectable by selecting the area that is associated with the particular section and that comprises the representative image thereof. This selection can be accomplished by means of, for example, a pointer on the navigation screen and a computer mouse. The section definition module SDF may then divide this selected section into respective subsections for which the representative image selection module RIS may determine representative images in a manner as described hereinbefore.

Figure 7:
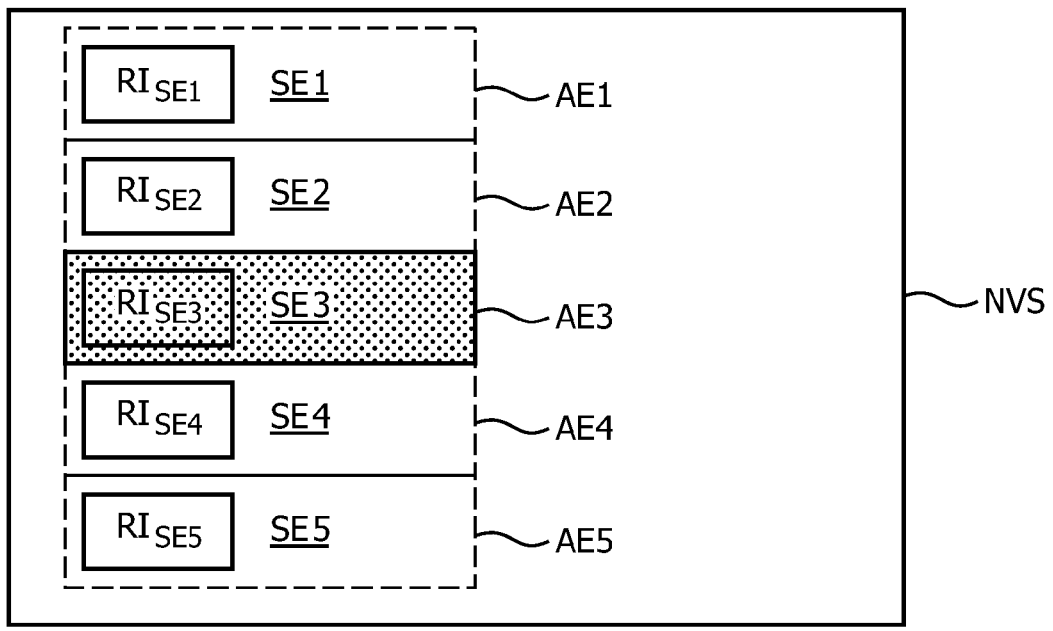
FIG. 7 is a conceptual diagram that illustrates a navigation screen that comprises respective representative images for respective sections.

FIG. 7 illustrates an example of a navigation screen NVS. In this example, the navigation screen represents five respective sections SE1-SE5 in the video VD. The five respective sections SE1-SE5 are represented by means of five representative images $RI_{SE1}$-$RI_{SE5}$ that have been selected as described hereinbefore. The five representative images $RI_{SE1}$-$RI_{SE5}$ are comprised in five respective areas AE1-AE2 associated with the five respective sections SE1-SE5. In the example, section SE3 is selected, which causes the area AE3 associated with this section to be highlighted.

The representative image selection module RIS illustrated in FIG. 6 may also serve to select a representative image RI for an entire video VD. In order to do so, the representative image selection module RIS carries out operations similar to those described hereinbefore. Namely, the representative image selection module RIS retrieves respective length indications LI for respective representative images RI of respective shots SH in the entire video VD. The representative image selection module RIS compares these respective length indications LI so as to determine the largest length indication. The representative image selection module RIS then selects the representative image that has this largest length indication. This selected representative image constitutes the representative image for the entire video.

Figure 8:
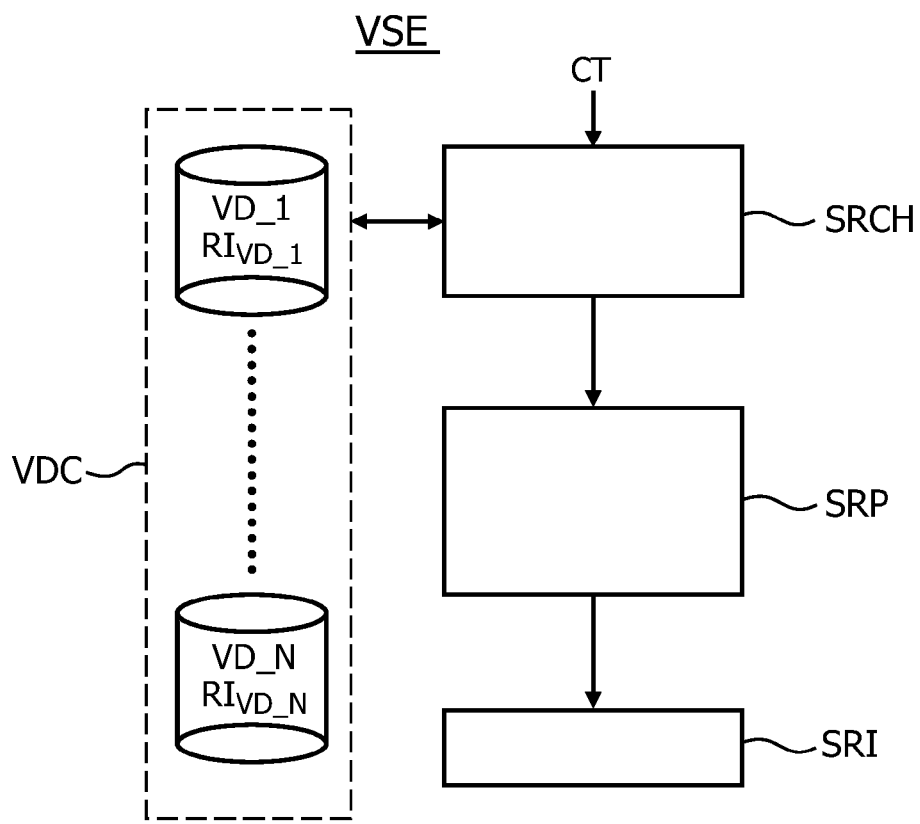
FIG. 8 is a functional diagram that illustrates a video search engine, which uses results that the representative image selection module produces.

FIG. 8 illustrates video search engine VSE. The video search engine VSE comprises a search module SRCH, a search results processing module SRP, and a search results indication module SRI. The video search engine VSE is communicatively coupled to a collection of videos VDC. Respective representative images $RI_{VD\_1}$-$RI_{VD\_N}$ have been selected for the respective videos VD_1-VD_N in the collection, as described in the preceding paragraph.

The video search engine VSE basically operates as follows. The search module SRCH receives search criteria CT and, in response, identifies respective videos in the collection that meet the search criteria CT. The search results processing module SRP identifies, among the respective videos that meet the search criteria CT, respective videos for which the respective representative images meet an image similarity test. This image similarity test may be based on one or more image properties and, if so, involve operations described hereinbefore with respect to the image property comparison module IPC illustrated in FIG. 3. The image similarity test may be relatively stringent. In case respective videos have been identified that are at least partially identical, the representative images for these respective videos will be relatively similar, or even an identical. This is because the representative images have been selected from the longest subsequences of images that have been found to be sufficiently similar, as described hereinbefore.

The search results indication module SRI indicates the respective videos for which the respective representative images meet the image similarity test, jointly as a single search result item. The respective videos that are indicated as a single search result item will typically be identical, at least partially. Indicating respective videos that are at least partially identical as a single search result item assists a user in comprehending and evaluating the search results.

Final Remarks

The detailed description hereinbefore with reference to the drawings is merely an illustration of the invention and the additional features, which are defined in the claims. The invention can be implemented in numerous different ways. In order to illustrate this, some alternatives are briefly indicated.

The invention may be applied to advantage in numerous types of products or methods related to identification of representative images for video content. For example, the invention may be used to advantage in any type of consumer electronics apparatus capable of handling video content, such as, for example a home cinema apparatus. The invention may also be in the form of a software program that can be executed by a general purpose processor in any type of apparatus.

For example, the video processor VPR illustrated in FIG. 1 may form part of a video server from which videos can be downloaded. A client station may then download a video from the video server together with shot cut markers and representative image identifiers, which the video server has generated.

The video browser VBR illustrated in FIG. 3 may form part of the client station so as to allow convenient browsing through the video on the basis of the representative image identifiers and, in particular, length indications comprised in these identifiers.

There are numerous ways of selecting images from a shot so as to obtain a continuous sequence of selected images that are evenly distributed throughout the shot. Subsampling is advantageous but not essential. In principle, all images of a shot can be selected. In case subsampling is applied, the selected images need not necessarily be precisely equidistantly spaced. For example, the selected images may be located on a time grid that exhibits slight irregularities.

There are numerous ways of identifying a continuous subsequence of selected images that meet a predefined similarity test. For example, it is possible to analyze all images in a first phase, so as to obtain image analysis results that can be subjected to the predefined similarity test in a second phase. What is more, there are numerous different schemes for comparing selected images with each other. For example, a selected image may be compared with the immediately preceding selected image, as well as further preceding selected images that have been found to meet the predefined similarity test. However, such an approach is more computationally intensive than those described hereinbefore. It should further be noted that the predefined similarity test may involve determining respective difference metrics for respective image properties. In that case, respective thresholds may be defined for the respective difference metrics for the purpose of making respective partial similarity decisions. The respective partial similarity decision can effectively be grouped into an overall similarity decision by means of, for example, an AND function.

There are numerous ways of selecting a representative image for a shot among a continuous stable portion of the shot that coincides in time with the longest continuous subsequence of selected images that meet the predefined similarity test. The representative image may be one of the selected images in the longest continuous subsequence. The representative image may also be an image that is temporally located between two such selected images. Any particular selection scheme may be used because images are relatively similar in the continuous stable portion of the shot that coincides in time with the longest continuous subsequence of selected images that meet the predefined similarity test. In principle, an image may even be randomly selected from the continuous stable portion of the shot coincides in time with the longest continuous subsequence.

The term "image" should be understood in a broad sense. The term embraces any type of data that represents visual information. For example, the term is interchangeable with other terms, such as, for example, picture, frame, and field.

In general, there are numerous different ways of implementing the invention, whereby different implementations may have different topologies. In any given topology, a single module may carry out several functions, or several modules may jointly carry out a single function. In this respect, the drawings are very diagrammatic. For example, referring to FIG. 3, the image property determination module IPD and the image property comparison module IPC may form part of a single software module.

There are numerous functions that may be implemented by means of hardware or software, or a combination of both. A description of a software-based implementation does not exclude a hardware-based implementation, and vice versa. Hybrid implementations, which comprise one or more dedicated circuits as well as one or more suitably programmed processors, are also possible. For example, various functions described hereinbefore with reference to the Figures may be implemented by means of one or more dedicated circuits, whereby a particular circuit topology defines a particular function.

There are numerous ways of storing and distributing a set of instructions, that is, software, which allows identifying representative images in accordance with the invention. For example, software may be stored in a suitable medium, such as, for example, a magnetic disk, an optical disk, or a memory circuit. A medium in which software is stored may be supplied as an individual product or together with another product, which may execute the software. Such a medium may also be part of a product that enables software to be executed. Software may also be distributed via communication networks, which may be wired, wireless, or hybrid. For example, software may be distributed via the Internet. Software may be made available for download by means of a server. Downloading may be subject to a payment.

The remarks made hereinbefore demonstrate that the detailed description with reference to the drawings is an illustration of the invention rather than a limitation. There are numerous alternatives, which fall within the scope of the appended claims. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps. The mere fact that respective dependent claims define respective additional features, does not exclude combinations of additional features other than those reflected in the claims.

The invention claimed is:

1. A method of determining a representative image (RI) for at least one shot (SH) in a video (VD), a shot being a continuous sequence of images representing a scene viewed from a particular location, the method comprising:
    a shot sampling step (SHS) of selecting images from a shot so as to obtain a continuous sequence of selected images (SI) that are distributed throughout the shot on a time grid that exhibits slight irregularities, not precisely equidistantly spaced;
    a stable shot portion identification step (SPI) of identifying at least one continuous subsequence (SB) of selected images within the obtained continuous sequence of selected images that meet a predefined similarity test; and
    a representative image designation step (RID) of selecting an image from a continuous portion (SP) of the shot that coincides in time with a longest continuous subsequence of selected images of the identified at least one continuous subsequence of selected images that meet the predefined similarity test, wherein the image that is selected constitutes a representative image (RI) for the shot.

2. The method of according to claim 1, wherein, in the stable shot portion identification step (SPI), the following series of steps are carried out for respective selected images:
    a measure of difference determining step (IPD, IPC) of comparing at least one image property (IP) of a selected image with that of another selected image so as to determine a measure of difference (DM) for the selected image; and
    a measure of difference evaluation step (SBI) of classifying the selected image as belonging to a continuous subsequence (SB) of selected images that meet the similarity test, or not, depending on whether the measure of difference for the selected image is below a threshold (TH), or not, respectively.

3. The method according to claim 2, wherein the selected image is compared with an immediately neighboring selected image.

4. The method according to claim 2, wherein, in case the immediately preceding selected image belongs to a continuous subsequence of selected images that meets the similarity test, the selected image is compared with the selected image that starts this continuous subsequence of selected images.

5. The method according to claim 2, wherein, in the measure of difference determining step (IPD, IPC), respective image property differences are combined into a difference metric (DM), which constitutes the measure of difference, the respective image property differences being obtained by comparing respective image properties (IP) of the selected image with those of at least one other selected image.

6. The method according to claim 1, wherein, in the shot sampling step (SHS), one image is selected out of each series of N consecutive images, N being an integer greater than 1.

7. The method according to claim 1, wherein, in the representative image designation step (RID), a length indication (LI) is provided for the representative image (RI), the length indication representing a time interval covered by the continuous portion (SP) of the shot from which the representative image is selected.

8. The method according to claim 7, further comprising:
    a shot association step (SAM) of associating a shot with at least one other shot that, when compared with the shot, meets a shot similarity test; and
    a length indication upgrading step (LIU) of upgrading the length indication (LI) for the representative image (RI) of the shot by adding thereto respective length indications for respective representative images of respective other shots that have been associated with the shot.

9. A method of browsing in a video (VD), the method using results obtained by carrying out the method according to claim 7, the results comprising respective representative images (RI) that have been determined for respective shots (SH) comprised in the video, and respective length indications (LI) for the respective representative images, the method comprising:
    a section definition step (SDF) of defining respective sections (SE) in the video, wherein the following step is carried out for respective sections in the video:
    a representative image selection step (RIS) of comparing respective length indications (LI1-LI4) for respective representative images (RI1-RI4) of respective shots (SH1-SH4) in a section (SE) and selecting the representative image that has a largest length indication to constitute a representative image ($RI_{SE}$) for the section.

10. The method of browsing in a video (VD) according to claim 9, wherein respective representative images ($RI_{SE1}$-$RI_{SE5}$) have been selected for respective sections (SE1-SE5) in the video, the method further comprising:
    a navigation enabling step (NAV) of generating a navigation screen (NVS) that comprises the respective representative images for the respective sections in the video and of providing the respective representative images in respective selectable areas (AE1-AE5) associated with the respective sections.

11. A method of determining a representative image for a video (VD) that uses results obtained by carrying out the method according to claim 7, the results comprising respective representative images (RI) that have been determined for respective shots (SH) comprised in the video, and respective length indications (LI) for the respective representative images, the method comprising:

a representative image selection step (RIS) of comparing the respective length indications for the respective representative images and selecting the representative image that has a largest length indication to constitute a representative image for the video.

12. A method of searching a video (VD) in a collection of videos (VDC), the method using results obtained by carrying out the method according to claim 11, wherein the results comprise respective representative images ($RI_{VD\_1}$-$RI_{VD\_N}$) for respective videos (VD1-VD-N) in the collection, the method comprising:

a search step (SRCH) of identifying respective videos in the collection that meet a search criterion;

a search results processing step (SRP) of identifying, among the respective videos that meet the search criterion, respective videos for which the respective representative images meet an image similarity test; and a search representation step (SRI) of jointly indicating the respective videos, for which the respective representative images meet the image similarity test, as a single search result item.

13. A non-transitory computer-readable storage medium embodied with instructions executable by a processor for carrying out the method according to claim 7 and storing results obtained thereby, wherein the results comprise respective representative images (RI) that have been determined for respective shots (SH) comprised in a video (VD), and respective length indications (LI) for the respective representative images.

14. A non-transitory computer-readable medium embodied with a computer program comprising a set of instructions that enables a processor, which is capable of executing the set of instructions, to carry out the method according to claim 1.

15. A video processor (VPR) capable of determining a representative image (RI) for at least one shot (SH) in a video (VD), a shot being a continuous sequence of images representing a scene viewed from a particular location, the video processor (VPR) comprising:

a shot sampling module (SHS) arranged to select images from a shot so as to obtain a continuous sequence of selected images (SI) that are distributed throughout the shot on a time grid that exhibits slight irregularities, not precisely equidistantly spaced;

a stable shot portion identification module (SPI) arranged to identify at least one continuous subsequence (SB) of selected images within the obtained continuous sequence of selected images that meet a predefined similarity test; and a representative image designation module (RID) arranged to select an image from a continuous portion (SP) of the shot that coincides in time with a longest continuous subsequence of selected images of the identified at least one continuous subsequence of selected images that meet the predefined similarity test, wherein the image that is selected constitutes a representative image (RI) for the shot.

* * * * *